(12) United States Patent
De Bolle et al.

(10) Patent No.: US 11,617,306 B2
(45) Date of Patent: Apr. 4, 2023

(54) DEVICE COMPRISING A MOTORIZED CONVEYOR FOR CONVEYING A FLOW OF HARVESTED CROP BASED ON DEVICE INCLINATION

(71) Applicant: CNH Industrial America LLC, New Holland, PA (US)

(72) Inventors: Lieven De Bolle, Mariakerke (BE); Nicolas Preau, Soullans (FR); Raphaël Metayer, Coëx (FR)

(73) Assignee: CNH Industrial America LLC, New Holland, PA (US)

( * ) Notice: Subject to any disclaimer, the term of this patent is extended or adjusted under 35 U.S.C. 154(b) by 861 days.

(21) Appl. No.: 16/474,447

(22) PCT Filed: Dec. 27, 2017

(86) PCT No.: PCT/EP2017/084677
§ 371 (c)(1),
(2) Date: Jun. 27, 2019

(87) PCT Pub. No.: WO2018/122281
PCT Pub. Date: Jul. 5, 2018

(65) Prior Publication Data
US 2019/0343047 A1   Nov. 14, 2019

(30) Foreign Application Priority Data
Dec. 28, 2016  (EP) ..................... 16306829

(51) Int. Cl.
*A01D 75/28* (2006.01)
*A01D 46/28* (2006.01)
*A01D 57/20* (2006.01)

(52) U.S. Cl.
CPC ........... *A01D 75/28* (2013.01); *A01D 46/285* (2013.01); *A01D 57/20* (2013.01)

(58) Field of Classification Search
CPC ...... A01D 46/285; A01D 57/20; A01D 46/26; A01D 75/28; B65G 43/08; B65G 43/10;
(Continued)

(56) References Cited

U.S. PATENT DOCUMENTS 6,148,989 A     11/2000  Ecker
6,990,794 B2 *   1/2006  Merant ................ A01D 46/285
                                                        56/328.1
(Continued)

FOREIGN PATENT DOCUMENTS

EP    0692183 A1    1/1996
EP    0783984 A2    7/1997
(Continued)

OTHER PUBLICATIONS

Notification of Transmittal of the International Search Report and the the Written Opinion of the International Searching Authority, or the Declaration dated Mar. 27, 2018 for International Application No. PCT/EP2017/084677 (10 pages).

*Primary Examiner* — Alicia Torres
(74) *Attorney, Agent, or Firm* — Peter Zacharias; Patrick Sheldrake (57) ABSTRACT

A device including at least one motorized conveyor for conveying a flow of harvested crop between an upstream end and a downstream end of the conveyor along a longitudinal direction. The device further including at least one sensor that monitors a longitudinal inclination of the device relative to a nominal orientation of the device. The device computes a conveyor speed based on the monitored longitudinal inclination, the conveyor speed being adapted to maintain conveying kinematics of the harvested crop independent from the longitudinal inclination; and the device operates the motorized conveyor at the computed conveyor speed.

15 Claims, 4 Drawing Sheets

(58) Field of Classification Search
CPC .............. B65G 41/008; B65G 65/005; B65G 2203/042; A01F 2015/0808
See application file for complete search history.

(56) References Cited

U.S. PATENT DOCUMENTS

| | | | |
|---|---|---|---|
| 7,430,845 B2* | 10/2008 | Kormann | A01D 43/085 |
| | | | 460/4 |
| 8,267,256 B2* | 9/2012 | Berthet | A01D 46/285 |
| | | | 209/672 |
| 8,708,153 B2* | 4/2014 | Hufford | B07B 13/003 |
| | | | 209/660 |
| 9,579,692 B2* | 2/2017 | Le Nevé | A23L 19/03 |
| 9,668,417 B2* | 6/2017 | Korthuis | B07B 1/10 |
| 2003/0014171 A1 | 1/2003 | Ma et al. | |
| 2003/0060245 A1 | 3/2003 | Doers et al. | |
| 2006/0270474 A1 | 11/2006 | Messenger | |
| 2014/0144118 A1 | 5/2014 | Le Neve et al. | |
| 2015/0135675 A1 | 5/2015 | Ritter et al. | |
| 2018/0054964 A1* | 3/2018 | Füchtling | A01D 41/127 |
| 2019/0232337 A1* | 8/2019 | Gialis | B07B 1/4636 |
| 2021/0282324 A1* | 9/2021 | Villis | B07B 1/155 |
| 2021/0282326 A1* | 9/2021 | Fillep | A01D 34/86 |

FOREIGN PATENT DOCUMENTS

| | | |
|---|---|---|
| EP | 2047736 A1 | 4/2009 |
| FR | 2498046 A1 | 7/1982 |
| FR | 2509114 A1 | 1/1983 |
| FR | 2768015 A1 | 3/1999 |
| GB | 2 028 626 A | 3/1980 |

* cited by examiner

DEVICE COMPRISING A MOTORIZED CONVEYOR FOR CONVEYING A FLOW OF HARVESTED CROP BASED ON DEVICE INCLINATION

TECHNICAL FIELD

The invention relates to a device comprising at least one motorized conveyor for conveying a flow of harvested crop, as well as a harvesting machine comprising such a device.

The invention applies to the field of mechanized harvesting of fruits growing on trees or bushed, especially fruit berries such as grapes, raspberries, red, white or blackcurrants, and other fruits growing in bunches.

BACKGROUND ART

Fruits are conventionally harvested by a harvesting machine comprising a motorised support structure which is movable along rows of plants, a harvesting unit being mounted on said structure for straddling at least one of said rows of plants and harvesting fruits from said row, in particular by means of a shaker system implemented in said harvesting unit. Then, the harvested crop obtained is conveyed into the machine to be stored in at least one hopper provided for that purpose or in an attached trailer.

However, because of the action of the shaker system, the harvested crop includes, in addition to detached fruits, and among other things, juice, leaves, wood particles, bunches of fruits of various sizes.

To eliminate components other than fruits, in particular leaves and wood particles, harvesting machines further include a cleaning unit which is adapted to eliminate by suction said components from the harvested crop before its storage.

Moreover, the search for quality, in particular in the field of vinification, requires destemming of the cleaned harvested crop to separate the fruits from the components attached to them, such as stalks, and thus to store only the separated fruits. To do so, the harvesting machines may also carry a destemming unit located downstream of the cleaning unit for achieved destemming of the harvested crop after their cleaning by said cleaning unit. It is furthermore possible to perform a previous sorting of the cleaned harvested crop before destemming, in order to destem only the remaining portion of said crop including bunches.

In particular, harvesting machines are known, the motorized support structure thereof comprises a lower portion carrying a harvesting unit and an upper portion carrying a cleaning unit, a previous sorting unit, a destemming unit and at least one storage hopper, said harvesting machines further embedding a recovery unit, which comprises at least one bucket conveyor adapted to recover the harvested crop under the harvesting unit and to convey said harvested crop on said upper portion.

Such harvesting machines also embed conveying devices with motorized conveyors that are adapted to convey the harvested crop between the different crop processing units located on the upper portion of the motorized support structure, said conveying being achieved between an upstream end and a downstream ends of said conveyors.

In particular, a harvesting machine may comprise a conveying device with three motorized conveyors adapted to convey a flow of harvested crop respectively under the cleaning unit, within the previous sorting unit and within the destemming unit, and thus along longitudinal directions, notably comprised in a longitudinal section plane of said machine that also comprises the moving direction of said machine. Moreover, such a conveying device may comprise another conveyor adapted to convey a flow of harvested crop from the cleaning unit to the longitudinal conveyor of the previous sorting unit, and thus along a transversal direction which extends perpendicularly to the moving direction of the machine in a transverse section plane of said machine.

These conveyors are generally operated with a constant speed during a whole harvesting procedure, and thus whatever the type of ground on which the harvesting machine is moving. However, a harvesting machine generally works on uneven grounds, comprising tilts, shoulders, gutters and areas of different solidity, so that the longitudinal inclination of said machine may vary all along a harvesting procedure, which may alter the functioning of the longitudinal conveyors, because of their sensibility to said longitudinal inclination.

In particular, for an efficient suction cleaning, the conveyor embedded upstream from the suction cleaning unit must be operated to pour the flow of harvested crop under the suction cleaning unit with a given ballistics, said ballistics being dependent not only from the conveyor speed, but also from the longitudinal slope of the harvesting machine.

Thus, the conveying kinematics of the harvested crop on these longitudinal conveyors is not constant, which may alter the quality of the cleaning, the previous sorting and/or the destemming of said harvested crop, and then the global quality of the whole crop.

The invention aims to improve the prior art by proposing a device comprising at least one motorized conveyor for conveying a flow of harvested crop, said device being in particular intended to be implemented in a harvesting machine, said device providing for adapting in real time the conveyor speed to operate said conveyor at to the longitudinal inclination taken by the machine during its movement, so as to maintain the conveying kinematics of the harvested crop on said conveyor independent from said inclination.

SUMMARY OF THE INVENTION

For that purpose, and according to a first aspect, the invention relates to a device comprising at least one motorized conveyor for conveying a flow of harvested crop between an upstream and a downstream ends of said conveyor along a longitudinal direction, said device further comprising:
- at least a sensor for monitoring a longitudinal inclination of the device relative to a nominal orientation of said device;
- means for computing a conveyor speed based on said monitored longitudinal inclination, said conveyor speed being adapted to maintain the conveying kinematics of the harvested crop substantially independent from said inclination;
- means for operating the motorized conveyor at said computed conveyor speed.

According to a second aspect, the invention relates to a harvesting machine comprising such a device.

DESCRIPTION OF THE FIGURES

Other aspects and advantages of the invention will become apparent in the following description made with reference to the appended figures, wherein.

DETAILED EMBODIMENTS OF THE INVENTION

With reference to these figures, we describe below a device comprising at least one motorized conveyor for conveying a flow of harvested crop between an upstream and downstream ends of said conveyor along a longitudinal direction, as well as a harvesting machine comprising such a device.

In particular, the longitudinal direction of the conveyor is comprised in a longitudinal section plane of the harvesting machine, said plane also comprising the moving direction of said harvesting machine.

The harvesting machine is in particular operable for the selective and mechanical harvesting of fruits growing on plants, such as trees or bushes, which are arranged in rows, and more particularly to fruits berries, such as grapes, raspberries, red, white or blackcurrants, and other fruits growing in bunches.

Figure 1:
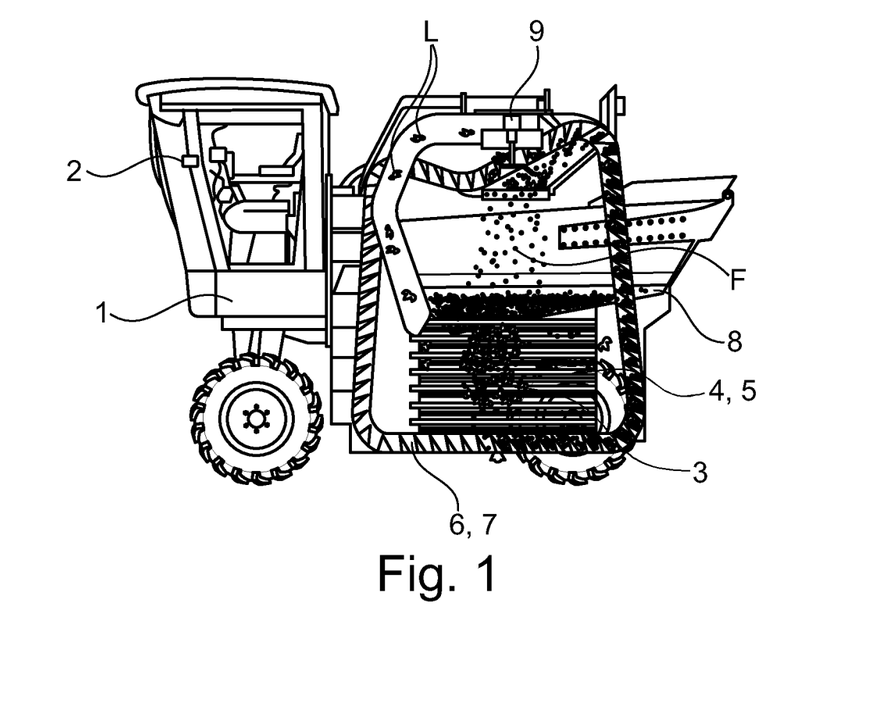
FIG. 1 represents a side view of a harvesting machine according to the invention.

To do so, the harvesting machine comprises a motorized support structure 1 that is equipped with a driver station 2 and that is movable along rows of plants 3, a harvesting unit 4 being mounted on a lower portion of said structure for straddling at least one of said rows of plants and detaching fruits F from said plants.

In particular, the harvesting unit 4 can be mounted on the support structure 1 permanently or removably, so as to be replaceable by other equipment and accessories, for example spraying equipment, pruning equipment or equipment for working the soil.

The harvesting unit 4 includes a straddling chassis which delimits a harvesting tunnel into which the plants 3 are successively introduced to move through said tunnel between respective openings at the front and at the rear of said tunnel. Moreover, the harvesting unit 4 includes a shaker system including two shaker devices 5, said shaker devices being arranged on respective sides of the harvesting tunnel to delimit said tunnel transversely.

The harvesting machine also includes a unit 6 for continuously recovering the crop detached by the harvesting unit 4, which comprises in particular, in addition to the detached fruits, stalks, juice, leaves L, pieces of wood, bunches of varied sizes. In one embodiment, the recovering unit 6 comprises at least one bucket conveyor 7 adapted to recover the harvested crop under the harvesting unit 4 and to convey said crop on an upper portion of the machine, in particular for the storage of said crop in at least one hopper 8 provided for that purpose.

For ensuring the best quality of the crop, especially in the context of vinification of grapes, it is desirable to eliminate the residues contained in the flow of harvested crop, in particular green residues such as stalks, leaves L, branches and pieces of wood. To do so, the harvesting machine may embed at least one processing unit on the upper portion of the support structure 1, in order to remove such residues from the flow of harvested crop provided by the recovery unit 6 before the storage of said flow in the hopper 8 and in an ancillary trailer.

Figure 2A:
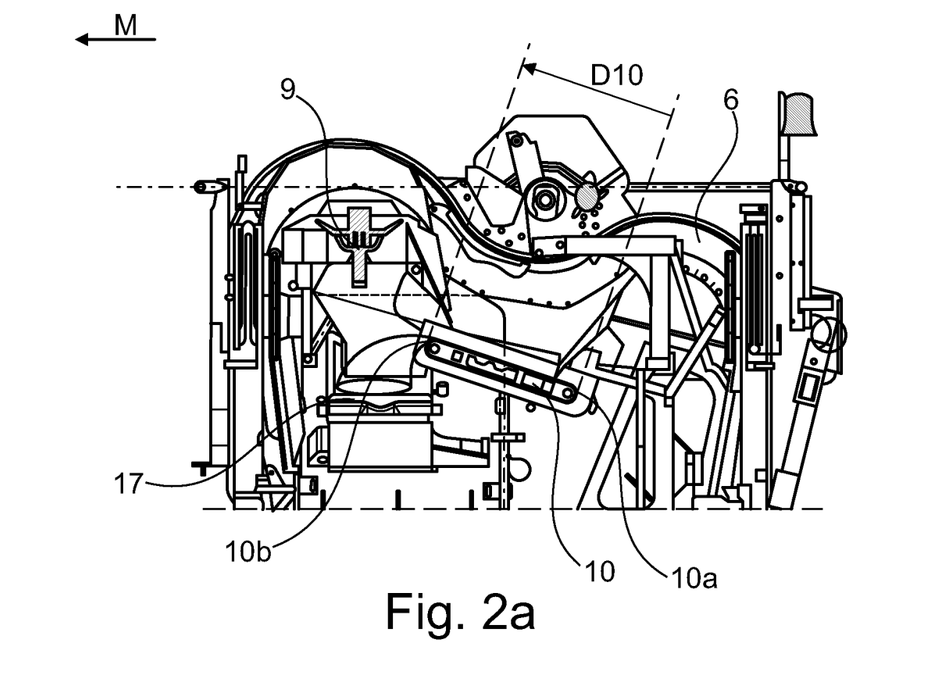
FIGS. 2a, 2b and 2c represent schematically in a side view the upper portion of a harvesting machine which is focused on the cleaning unit, respectively during a movement of the machine on a horizontal ground (FIG. 2a), on a ground with a longitudinal upslope (FIG. 2b) and on a ground with a longitudinal downslope (FIG. 2c)
Figure 2B:
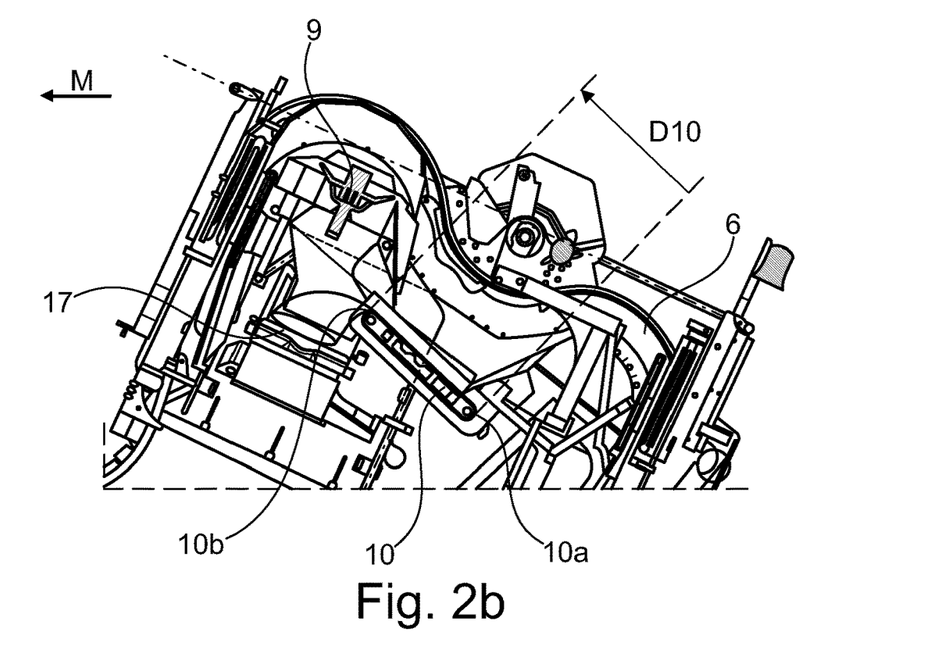
Figure 2C:
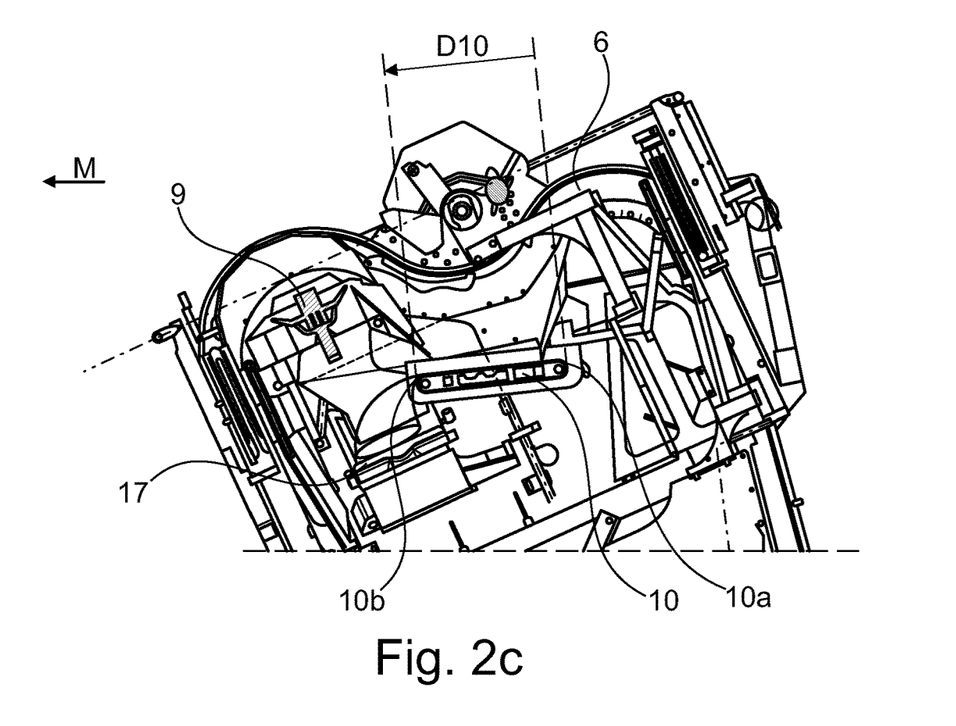

To do so, with reference to FIGS. 1 and 2, the harvesting machine comprises a suction cleaning unit 9 that is provided on the upper portion of the support structure 1 to eliminate by suction light residues, in particular leaves L, from the flow of harvested crop coming directly from the recovery unit 6.

In particular, as represented on FIG. 2, the harvesting machine comprises a conveying device, which comprises a motorized conveyor 10 which is embedded between the recovery unit 6 and the suction cleaning unit 9, said motorized conveyor being arranged for conveying the flow of harvested crop between an upstream end 10a, which is fed with the flow of harvested crop by the recovery unit 6, and a downstream end 10b of said conveyor, which leads under the suction cleaning unit 9, said conveying being achieved along a longitudinal direction D10, which is notably comprised in a longitudinal section plane of the harvesting machine, said plane also comprising the moving direction M of said harvesting machine during the harvesting procedure.

Figure 3A:
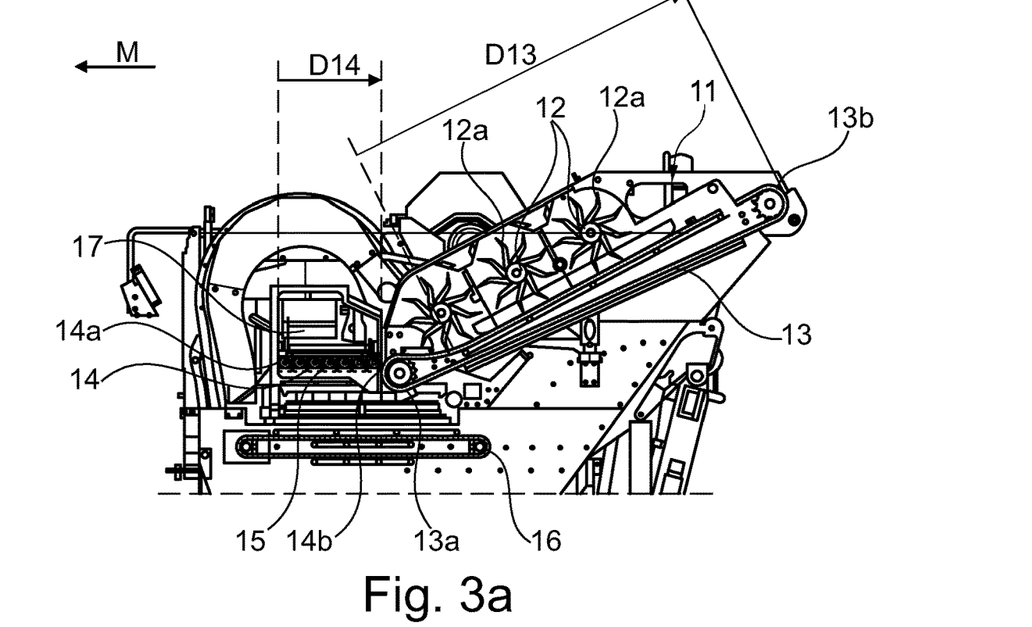
FIGS. 3a, 3b and 3c represent schematically in a side view the upper portion of a harvesting machine which is focused on the destemming unit and the previous sorting unit, respectively during a movement of the machine on a horizontal ground (FIG. 3a), on a ground with a longitudinal upslope (FIG. 3b) and on a ground with a longitudinal downslope (FIG. 3c)
Figure 3B:
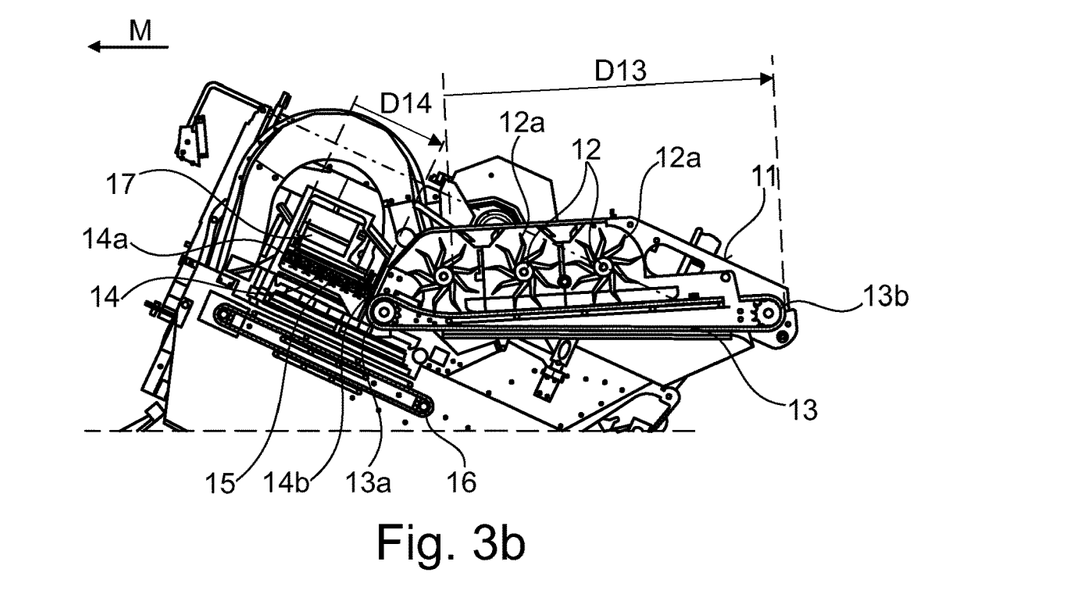
Figure 3C:
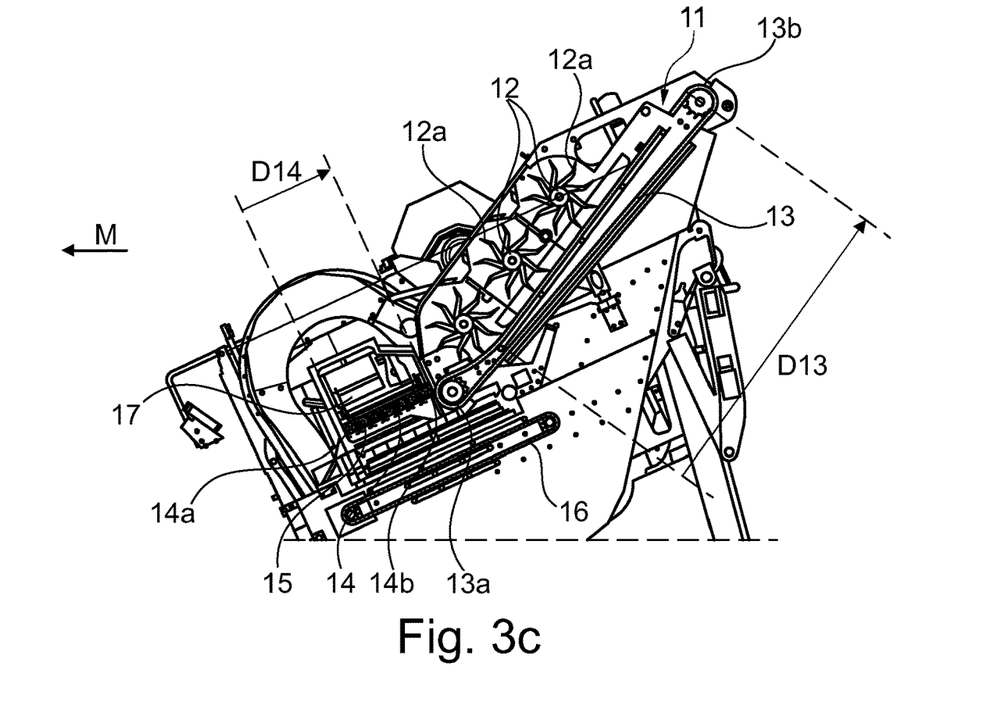

With reference to FIG. 3, the harvesting machine further comprises a destemming unit 11 which is arranged downstream of the suction cleaning unit 9 for enabling the destemming of the bunches contained in the flow of cleaned harvested crop, so as to enable the removing of the stalks attached to the fruits F and to store only said fruits and the juice.

To do so, the destemming unit 11 comprises motorized rotary members 12, each of said rotary members including paddles 12a which are adapted, on rotation of said rotary members, to interact with the flow of harvested crop in order to separate fruits F attached to bunches.

Moreover, the conveying device comprises a motorized conveyor 13 which is arranged to convey a flow of cleaned harvested crop under the rotary members 12 within the destemming unit 11, said conveying being achieved between an upstream end 13a and a downstream end 13b of said conveyor along a longitudinal direction D13 comprised in a longitudinal section plane of the harvesting machine that also comprises the moving direction M of the harvesting machine during the harvesting procedure. In particular, the motorized conveyor 13 is arranged as a sieve and comprises openings that are adapted to allow the detached fruits F to pass through them, in particular to be recovered within a storage hopper 8 provided under said conveyor.

As represented on FIG. 3, the conveying device further comprises a motorized conveyor 14 which is embedded between the suction cleaning unit 9 and the destemming unit 11, said motorized conveyor being arranged for conveying the flow of cleaned harvested crop within the destemming unit 11, said conveying being achieved between an upstream end 14a, which is fed with the flow of harvested crop that was previously cleaned by the suction cleaning unit 9, and a downstream end 14b of said conveyor, which leads near the upstream end 13a of the sieve-conveyor 13 of the destemming unit 11, and thus along a longitudinal direction D14 comprised in a longitudinal section plane of the harvesting machine that also comprises the moving direction M of the harvesting machine during the harvesting procedure.

In particular, the motorized conveyor 14 may form a previous sorting unit for removing already detached fruits F from the flow of harvested crop before its entry within the destemming unit 11. To do so, the motorized conveyor 14 comprises a plurality of rollers 15 spaced longitudinally and driven in rotation, said rollers being arranged to form therebetween vertical opening the geometry of which is adapted to enable detached fruits F from the conveyed flow of harvested crop to pass through them, in particular for allowing their recovery by a lower conveyor 16 leading to a storage hopper 8, and to retain elements of larger sizes, especially the bunches to be destemmed, on said motorized conveyor.

With reference to FIGS. 2, 3, the conveying device further comprises a motorized conveyor 17 adapted to convey the flow of harvested crop from the suction cleaning unit 9 to the previous-sorting motorized conveyor 14, and thus along a transversal direction which extends perpendicularly to the moving direction M of the harvesting machine in a transverse section plane of said machine.

During a harvesting procedure, a harvesting machine generally works on uneven grounds, comprising tilts, shoulders, gutters and areas of different solidity, so that the longitudinal inclination of said machine may vary all along said harvesting procedure, which may alter the functioning of the longitudinal conveyors 10, 13, 14 of the conveying device, because of their sensibility to said longitudinal inclination.

In particular, for an efficient suction cleaning, the conveyor 10 must be operated to pour the flow of harvested crop under the suction cleaning unit 9 with a given ballistics, said ballistics being dependent not only from the conveyor speed, but also from the longitudinal inclination of the harvesting machine.

Thus, the conveying kinematics of the harvested crop on these longitudinal conveyors is not constant, which may alter the quality of the cleaning, the previous sorting and/or the destemming of said harvested crop, and then the global quality of the whole crop.

Indeed, when the harvesting machine moves on a longitudinal upslope, the conveyor 10 fed by the recovery unit 6 conveys the flow of harvested crop to the suction cleaning unit 9 with a decelerated kinematics, and on the contrary performs said conveying with an accelerated kinematics during a moving of said harvesting machine on a longitudinal downslope, which alters in both cases the ballistics of the pouring of the flow of harvested crop under the suction cleaning unit 9, and then alters not only the efficiency of the suction of the leaves L from the harvested crop, but also the pouring of the cleaned harvested crop on the transversal conveyor 17 leading to the previous-sorting 14 and destemming 12, 13 units.

In the same way, when the harvesting machine moves on a longitudinal downslope, the previous-sorting conveyor 14 and the destemming conveyor 13 convey the harvested crop with a decelerated kinematics, and on the contrary perform said conveying with an accelerated kinematics during a moving of said harvesting machine on a longitudinal upslope, which alters in both cases the quality of the previous sorting and of the destemming of the harvested crop.

To avoid these drawbacks, we describe below a device which provides for adapting in real time the conveyor speed to operate a motorized conveyor 10, 13, 14 at to the longitudinal inclination taken by the harvesting machine during its movement, so as to maintain the conveying kinematics of the harvested crop on said conveyor independent from said inclination.

The device comprises at least a sensor for monitoring a longitudinal inclination of said device, which corresponds in particular to a longitudinal inclination of the harvesting machine in which said device is embedded, in relation to a nominal orientation of said device, which corresponds in particular to a nominal orientation of said machine.

According to an embodiment, the nominal orientation of the harvesting machine corresponds to a moving of said machine on a horizontal ground, as represented on FIGS. 2*a* and 3*a*.

In particular, the device is arranged for operating the motorized conveyor 10, 13, 14 on a range of longitudinal inclination comprised between −45° and +45°, which corresponds to the maximal ranges at which said conveyor may be operated with real efficiency.

Figure 4:
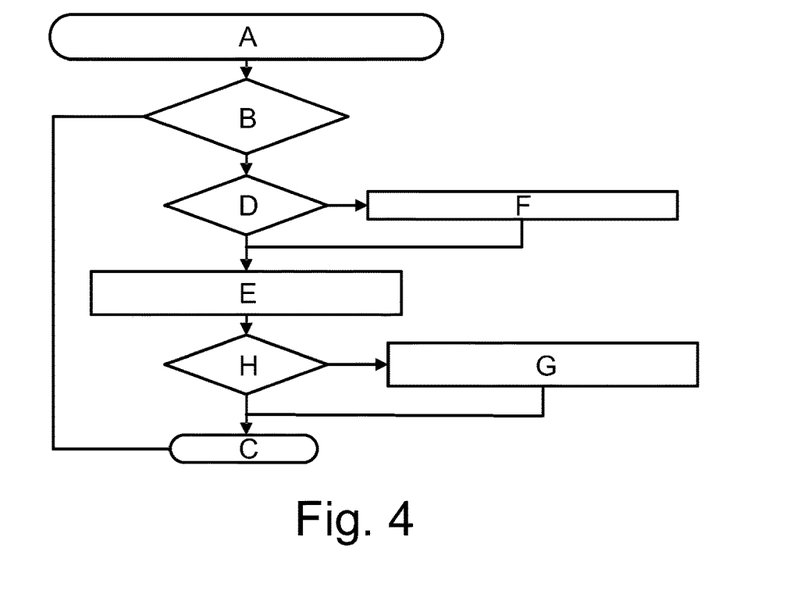
FIG. 4 represents schematically the successive steps of a process implemented by a device according to an embodiment of the invention.

With reference to FIG. 4, the device comprises means for implementing a step A for starting the operation of the conveyor 10, 13, 14, for example upon activation by a human operator of the harvesting machine of an appropriate mean located in the driver station 2 of said harvesting machine, such as a step B which is launched consecutively to the starting step A for checking if all the required conditions are reunited for operating correctly said conveyor, in particular the value of the monitored longitudinal inclination, but also the operating mode of said machine, i.e. if said machine is performing or not a harvesting procedure.

Thus, if the value of the monitored longitudinal inclination falls within the range comprised between −45° and +45° and if the harvesting machine is currently performing a harvesting procedure, the device can then launch the following step. Otherwise, i.e. if the value of the monitored longitudinal inclination is lower than −45° or greater than +45° and/or if the harvesting machine is not currently performing a harvesting procedure, the device can launch directly an ending step C.

In particular, the device can operate a closed loop which provides for relaunching automatically a checking step B after the completion of an ending step C, especially as long as the harvesting machine is operated.

The device further comprises means for computing a conveyor speed based on the longitudinal inclination monitored by the at least one sensor embedded in said device, said conveyor speed being adapted to maintain the conveying kinematics of the harvested crop independent from said inclination. Moreover, the device comprises means for operating the motorized conveyor 10, 13, 14 at the computed conveyor speed.

In particular, the device comprises means for determining a nominal conveyor speed corresponding to a requested conveying kinematics of the harvested crop when the monitored longitudinal inclination is null, for example when the harvesting machine is moving on a horizontal ground (FIGS. 2*a*, 3*a*), as well as means for operating the motorized conveyor 10, 13, 14 at said nominal conveyor speed when the machine is in its nominal orientation.

For example, the nominal conveyor speed can be standard, and notably initially predefined before the first commissioning of the harvesting machine. In a variant, the nominal conveyor speed can be selected by the operator of the harvesting machine, the means for determining the nominal conveyor speed being arranged to allow said operator to perform such a selection.

According to an embodiment, the device comprises means for implementing an initial step for defining the nominal conveyor speed in the nominal orientation of the machine, said nominal conveyor speed being then tunable in function of potential modifications in time of the kinematics of the harvested crop.

In particular, the device can comprise means for storing the nominal conveyor speed, as well as means for testing the validity of a previous nominal conveyor speed before defining a new one. With reference to FIG. 4, once the step B has successfully checked the fulfilling of all the requested conditions, the device provides for launching a consecutive step D for checking the validity of a previous nominal conveyor speed.

Then, if the validity of the previous nominal speed is correct, the device provides for launching a consecutive main step E for computing a conveyor speed based on the monitored longitudinal inclination and for operating the motorized conveyor 10, 13, 14 at said computed conveyor speed. Otherwise, the device previously provides for launching a step F for defining a new and valid nominal conveyor speed, and then for launching the main step E once said new and valid nominal conveyor speed has been stored.

According to an embodiment, the device comprises means for determining, for example during a step for setting up the computing and operating means of the device, a gain chart to apply to the nominal conveyor speed in function of the monitored longitudinal inclination, so that, during the main step E, the means for computing the conveyor speed to operate the motorized conveyor 10, 13, 14 at will compute said conveyor speed by using said gain chart.

In particular, the gains of the gain chart are higher—respectively lower—than a nominal value for a positive—respectively negative—longitudinal inclination as regards the conveying direction D10, D13, D14, i.e. the direction between the upstream 10a, 13a, 14a and downstream 10b, 13b, 14b of the motorized conveyor 10, 13, 14.

Advantageously, the gains of the gain chart are percentages, the means for computing the conveyor speed being arranged to compute said conveyor speed upon multiplying the nominal conveyor speed by said gains. In particular, the nominal value of the gains corresponds to a percentage of 100% and is applied to the nominal conveyor speed by the means for computing the conveyor speed when the machine is in its nominal orientation, the values of the gains corresponding to a non-null monitored longitudinal inclination being percentages which are higher—respectively lower—to 100% for a positive—respectively negative—longitudinal inclination as regards the conveying direction D10, D13, D14.

For example, with reference to FIG. 2, the motorized conveyor 10 feeding the suction cleaning unit 9 conveys the flow of harvested crop along a conveying direction D10 which forms an upslope that is oriented according to the moving direction M of the harvesting machine.

Thus, when the harvesting machine moves along a longitudinal upslope (FIG. 2b), the value of said upslope increases the upslope of the conveying direction D10, and then is positive as regards said conveying direction, which may decelerate the conveying kinematics of the flow of harvested crop on the motorized conveyor 10, so that the corresponding percentage will be superior to 100% to operate said motorized conveyor at an increased conveyor speed.

On the contrary, when the harvesting machine moves along a longitudinal downslope (FIG. 2c), the value of said downslope decreases the upslope of the conveying direction D10, and then is negative as regards said conveying direction, which may accelerate the conveying kinematics of the flow of harvested crop on the motorized conveyor 10, so that the corresponding percentage will be inferior to 100% to operate said motorized conveyor at a decreased conveyor speed.

In a same manner, with reference to FIG. 3, the previous-sorting 14 and destemming 13 motorized conveyors convey the flow of harvested crop along conveying directions D13, D14 which both form an upslope that is oriented opposite to the moving direction M of the harvesting machine.

Thus, when the harvesting machine moves along a longitudinal upslope (FIG. 3b), the value of said upslope decreases the upslope of these conveying directions D13, D14, and then is negative as regards said conveying directions, which may accelerate the conveying kinematics of the flow of harvested crop on these motorized conveyors 13, 14, so that the corresponding percentage will be inferior to 100% to operate said motorized conveyors at a decreased conveyor speed On the contrary, when the harvesting machine moves along a longitudinal downslope (FIG. 3c), the value of said downslope increases the upslope of these conveying directions D13, D14, and then is positive as regards said conveying directions, which may decelerate the conveying kinematics of the flow of harvested crop on these motorized conveyors 13, 14, so that the corresponding percentage will be superior to 100% to operate said motorized conveyors at an increased conveyor speed.

Once the main step E has been performed, the device can provide to launch directly the end step C, and then for restarting a loop by launching a consecutive checking step B, so as to continuously adapt the conveyor speed of the motorized conveyors 10, 13, 14 to the variations of longitudinal inclination of the harvesting machine during its movements.

In particular, the means for operating the motorized conveyor can be arranged for operating a motorized conveyor 10, 13, 14 at a newly computed speed only if the difference between said newly computed speed and the speed at which said motorized conveyor is currently operated is superior to a predefined threshold, for example 5 rounds per minute, said means for operating still operating said motorized conveyor at said currently operated speed otherwise.

According to an embodiment, the device comprises means for allowing a human operator of the harvesting machine to modify the speed to operate the motorized conveyor 10, 13, 14 at, in particular through dedicated means implemented for that purpose in the driver station 2 of said harvesting machine.

Indeed, after the computing of a conveyor speed and the operating of a motorized conveyor 10, 13, 14 at said computed conveyor speed, the human operator can check the effects of said conveyor speed on the conveying kinematics of a flow of harvested crop on said conveyor, for example by checking the ballistics of the pouring of said flow from the conveyor 10 under the suction cleaning unit 9 and/or by checking the conveying kinematics of said flow on the previous-sorting 14 and/or destemming 14 conveyors.

Then, if the conveying kinematics and/or the pouring ballistics are not satisfactory, the human operator can modify the conveyor speed to operate the concerned motorized conveyor(s) 10, 13, 14 at to correct said conveying kinematics and/or pouring ballistic.

Advantageously, the device comprises means for using this modified speed for computing the subsequent conveyor speed to operate the motorized conveyor 10, 13, 14 at.

With reference to FIG. 4, the device further provides, in case of a modification of the conveyor speed by the human operator, for launching a step H consecutive to the main step E to operate the motorized conveyor 10, 13, 14 at said modified conveyor speed, and then for launching the ending step C for restarting a new loop.

In particular, the step H can provide for calculating the absolute value of the difference between the conveyor speed modified by the human operator and the conveyor speed that was computed during the main step E, and for checking if said absolute value goes or not beyond a predefined threshold, for example 1 round per second.

Then, if the absolute value effectively goes beyond this threshold, the device can provide for launching a step G for storing the modified speed, and then for launching the ending step C for restarting a loop, wherein said stored modified speed will be used for the computing of the subsequent conveyor speed to operate the motorized conveyor 10, 13, 14 at. Otherwise, the device can directly launch the ending step C for restarting a new loop without taking into account the modified speed.

In particular, at the beginning of a new loop, the step D can check the validity of a previous nominal conveyor speed in relation to the storing or not of a modified speed during the previous loop. Thus, if a modified speed has been effectively stored during the previous loop, the step D will consider the previous nominal speed as invalid and then will launch the step F for defining a new and valid nominal conveyor speed based on said stored modified speed. For example, the step F can compute a new nominal conveyor speed upon dividing the stored modified speed by the gain of the gain chart corresponding to the longitudinal inclination monitored during the step F.

Otherwise, the step D can launch directly the main step E for computing the conveyor speed according to the previous nominal conveyor speed.

Moreover, the device can comprise means for allowing the human operator to modify the nominal conveyor speed during the initial step for its definition, wherein the harvesting machine is operated on a nominal orientation, for example on a horizontal ground.

To do so, during the achievement of the step F for defining a new and valid nominal conveyor speed for a given motorized conveyor 10, 13, 14, the human operator can check the effects of said nominal conveyor speed on the conveying kinematics of a flow of harvested crop on said motorized conveyor, for example by checking the ballistics of the pouring of said flow from the motorized conveyor 10 under the suction cleaning unit 9 and/or by checking the conveying kinematics of said flow on the previous-sorting 14 and/or destemming 14 motorized conveyors.

Then, if the conveying kinematics and/or the pouring ballistics are not satisfactory, the human operator can modify the nominal conveyor speed to operate the concerned motorized conveyor(s) 10, 13, 14 at to correct said conveying kinematics and/or pouring ballistic, said modified nominal conveyor speed being then stored as a new and valid nominal conveyor speed.

The invention claimed is:

1. A device having a moving direction, comprising:
    at least one motorized conveyor for conveying a flow of harvested crop between an upstream end and a downstream end of said conveyor along a longitudinal direction, the longitudinal direction and the moving direction being in the same plane; and
    at least one sensor, said at least one sensor monitoring a longitudinal inclination of the device relative to a nominal orientation of said device, the device carrying out the steps of:
        computing a conveyor speed based on said monitored longitudinal inclination, said conveyor speed being adapted to maintain conveying kinematics of the harvested crop independent from said longitudinal inclination; and
        operating the motorized conveyor at said computed conveyor speed.

2. The device according to claim 1, wherein the nominal orientation of the device corresponds to a moving of said device on a horizontal ground.

3. The device according to claim 1, wherein the device further carries out the steps of:
    determining a nominal conveyor speed corresponding to a requested conveying kinematics of the harvested crop when the longitudinal inclination is null; and
    operating the motorized conveyor at said nominal conveyor speed when the device is in its nominal orientation.

4. The device according to claim 3, wherein the device further carries out the steps of:
    determining a gain chart to apply to the nominal conveyor speed in function of the monitored longitudinal inclination; and
    computing the conveyor speed to operate the motorized conveyor by using said gain chart.

5. The device according to claim 4, wherein the gains of the gain chart are higher than a nominal value for a positive longitudinal inclination as regards the conveying direction.

6. The device according to claim 3, wherein the device carries out the step of implementing an initial step for defining the nominal conveyor speed in the nominal orientation of the device, said nominal conveyor speed being then tunable in function of potential modifications in time of the kinematics of the harvested crop.

7. The device according to claim 6, wherein the device further carries out the steps of:
    storing the nominal conveyor speed; and
    testing the validity of a previous nominal conveyor speed before defining a new nominal conveyor speed.

8. The device according to claim 1, wherein a human operator of the device modifies the speed to operate the motorized conveyor at.

9. The device according to claim 8, wherein the device uses the modified speed for computing the subsequent conveyor speed to operate the motorized conveyor at.

10. A harvesting machine, comprising
    a device moving in a moving direction of the harvesting machine including:
        at least one motorized conveyor for conveying a flow of harvested crop between an upstream end and a downstream end of said conveyor along a longitudinal direction, the longitudinal direction and the moving direction being in the same plane; and
        at least one sensor, said at least one sensor monitoring a longitudinal inclination of the device relative to a nominal orientation of the device, the device carrying out the steps of:
            computing a conveyor speed based on said monitored longitudinal inclination, said conveyor speed being adapted to maintain conveying kinematics of the harvested crop independent from said longitudinal inclination; and
            operating the motorized conveyor at said computed conveyor speed.

11. The harvesting machine according to claim 10, further comprising a suction cleaning unit, the motorized conveyor being arranged for conveying a flow of harvested crop under said suction cleaning unit.

12. The harvesting machine according to claim 10, further comprising a destemming unit, the motorized conveyor being arranged for conveying a flow of harvested crop within said destemming unit.

13. The harvesting machine according to claim 10, wherein the harvesting machine is arranged for the harvesting of fruits and/or berries.

14. The device of claim 4, wherein the gains of the gain chart are lower than a nominal value for a negative longitudinal inclination as regards the conveying direction.

15. The device of claim 1, wherein the steps carried out by the device are repeatedly carried out if the device is preforming a harvesting operation and the longitudinal inclination is between +45° and −45°, and the steps are stopped if the longitudinal inclination is not between +45° and −45°.

* * * * *